US012230175B2

(12) United States Patent
Kobayashi et al.

(10) Patent No.: US 12,230,175 B2
(45) Date of Patent: Feb. 18, 2025

(54) CIRCUIT DEVICE AND HEAD-UP DISPLAY APPARATUS

(71) Applicant: SEIKO EPSON CORPORATION, Tokyo (JP)

(72) Inventors: Daisuke Kobayashi, Chino (JP); Yasutoshi Akiba, Chino (JP); Kumar Anandabairavasamy Anand, Richmond (CA); Wittmeir Manfred, Aichach (DE); Tyler Dahlman, Richmond (CA)

(73) Assignee: SEIKO EPSON CORPORATION (JP)

( * ) Notice: Subject to any disclaimer, the term of this patent is extended or adjusted under 35 U.S.C. 154(b) by 183 days.

(21) Appl. No.: 17/974,632

(22) Filed: Oct. 27, 2022

(65) Prior Publication Data

US 2023/0140777 A1 May 4, 2023

(30) Foreign Application Priority Data

Oct. 28, 2021 (JP) ................................. 2021-176093

(51) Int. Cl.
*G09G 5/38* (2006.01)
*G09G 3/00* (2006.01)

(52) U.S. Cl.
CPC ......... *G09G 3/002* (2013.01); *G09G 2330/12* (2013.01); *G09G 2360/145* (2013.01)

(58) Field of Classification Search
CPC ........... G09G 2380/10; G09G 2330/12; G09G 3/002; G09G 3/3426; G09G 2340/14; G09G 2320/0261; G09G 5/38; G09G 2320/0285; G06T 5/80; G06T 5/90; G06T 2207/30252; G06T 3/18; G06F 11/004; G06F 11/07
See application file for complete search history.

(56) References Cited

U.S. PATENT DOCUMENTS

| | | | |
|---|---|---|---|
| 2008/0088526 | A1 | 4/2008 | Kadantseva et al. |
| 2018/0203226 | A1 | 7/2018 | Tomioka |
| 2019/0013826 | A1 | 1/2019 | Kikuta et al. |
| 2020/0201035 | A1 | 6/2020 | Anand et al. |
| 2020/0221057 | A1 | 7/2020 | Shimoda et al. |

(Continued)

FOREIGN PATENT DOCUMENTS

| | | |
|---|---|---|
| JP | 2008-108251 A | 5/2008 |
| JP | 2017-035980 A | 2/2017 |

(Continued)

*Primary Examiner* — Hau H Nguyen
(74) *Attorney, Agent, or Firm* — Harness, Dickey & Pierce, P.L.C.

(57) ABSTRACT

A circuit device is used for a head-up display apparatus. The circuit device includes a distortion correction circuit and an error detection circuit. The distortion correction circuit performs a distortion correction on input image data as image data of an input image and outputs output image data as image data of an output image after the distortion correction. Respective first divisional areas of a first divisional area group formed by division of the input image correspond to respective second divisional areas of a second divisional area group in the output image in the distortion correction. Here, the error detection circuit detects an occlusion error in a display image of the head-up display apparatus based on the output image data of the respective second divisional areas.

12 Claims, 11 Drawing Sheets

(56) References Cited

U.S. PATENT DOCUMENTS

| | | | | |
|---|---|---|---|---|
| 2021/0019867 | A1* | 1/2021 | Hayashi | G09G 5/38 |
| 2021/0256260 | A1* | 8/2021 | Kaneko | G01C 21/28 |

FOREIGN PATENT DOCUMENTS

| | | | |
|---|---|---|---|
| JP | 2017-111219 | A | 6/2017 |
| JP | 2020-101784 | A | 7/2020 |
| WO | 2019-058645 | A1 | 3/2019 |

* cited by examiner

CIRCUIT DEVICE AND HEAD-UP DISPLAY APPARATUS

The present application is based on, and claims priority from JP Application Serial Number 2021-176093, filed Oct. 28, 2021, the disclosure of which is hereby incorporated by reference herein in its entirety.

BACKGROUND

1. Technical Field

The present disclosure relates to a circuit device, a head-up display apparatus, etc.

2. Related Art

JP-A-2020-101784 discloses a circuit device used for a head-up display. The circuit device includes an error detection circuit and a processing circuit. The error detection circuit detects an occurrence of a first glare error when a glare index value obtained from head-up display image data exceeds a first threshold. The processing circuit performs processing for the first glare error when the occurrence of the first glare error is detected.

In JP-A-2020-101784, the glare index value is obtained from image data of the entire screen and the occurrence of the first glare error is detected based on the glare index value. That is, the common glare detection for the entire screen of the head-up display is performed and there is a problem that only the common processing for dealing with an error for the entire screen can be performed.

SUMMARY

An aspect of the present disclosure relates to a circuit device used for a head-up display apparatus, including a distortion correction circuit performing a distortion correction on input image data as image data of an input image and outputting output image data as image data of an output image after the distortion correction, and an error detection circuit, when respective first divisional areas of a first divisional area group formed by division of the input image correspond to respective second divisional areas of a second divisional area group in the output image in the distortion correction, detecting an occlusion error in a display image of the head-up display apparatus based on the output image data of the respective second divisional areas.

Another aspect of the present disclosure relates to a head-up display apparatus including the above described circuit device, a processing device controlling the circuit device, and a display device projecting the display image based on the output image data from the circuit device.

DESCRIPTION OF EXEMPLARY EMBODIMENTS

As below, preferred embodiments of the present disclosure will be explained in detail. The following embodiments do not unduly limit the details described in the appended claims and not all configurations described in the embodiments are essential component elements.

1. First Configuration Example of Display System and Circuit Device

Figure 1:
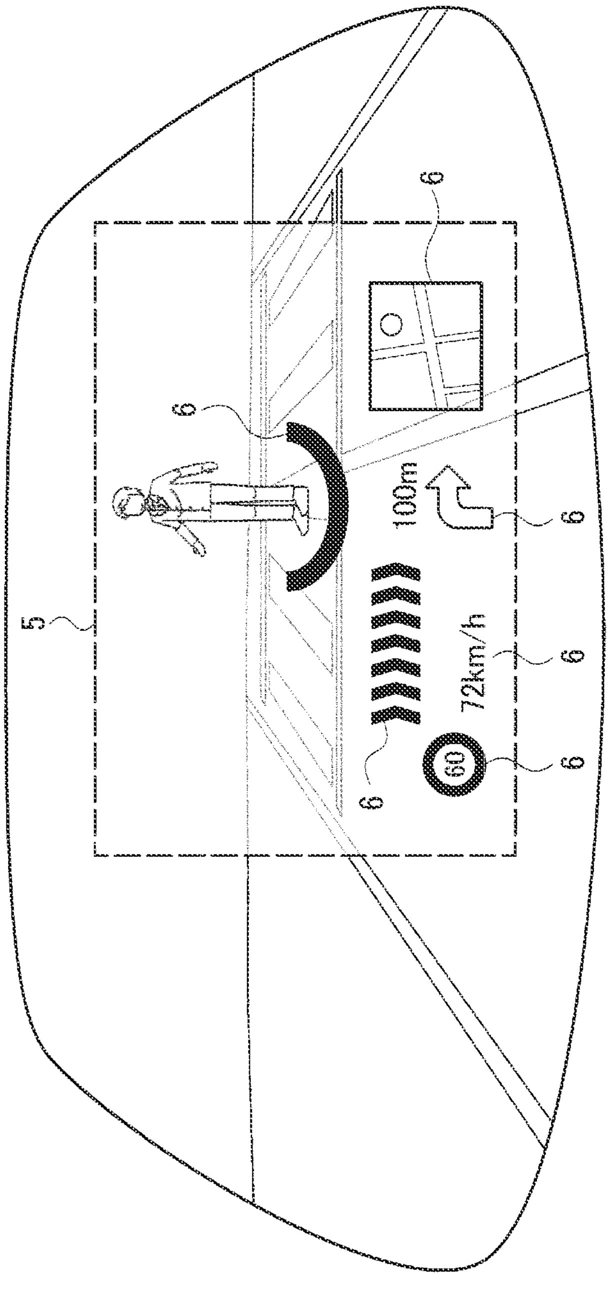
FIG. 1 shows a display example of an HUD.

FIG. 1 shows a display example of an HUD. HUD is an abbreviation for head-up display. As below, a head-up display may be appropriately abbreviated as an HUD.

The HUD includes a liquid crystal panel, a backlight device, and a reflection plate. The backlight device outputs light, the light transmitted through the liquid crystal panel is reflected toward a screen by the reflection plate, and the light reflected by the screen enters eyes of a user. Thereby, virtual display objects 6 corresponding to display objects displayed on the liquid crystal panel are projected in the field of view of the user. The virtual display objects 6 overlap with a real space as the background of HUD display. Within a display area 5 of the HUD, an area where the virtual display objects 6 are not displayed is an area in a transparent color without any display since it is in a non-transmissive state in the liquid crystal panel, and the background is seen as it is.

Here, the display objects 6 of the HUD hide the background, and thereby, visibility of the background overlapping with the display objects 6 may be reduced. In the above described JP-A-2020-101784, whether or not the glare index of an entire display area 5 exceeds a threshold is detected, however, it is desirable that a portion with reduced background visibility is detectable. As an example, in view of continuation of information presentation to the user, it is desirable that the HUD display is maintained as much as possible. When the portion with the reduced background visibility is detectable, the HUD display of the entire screen is not set to be transparent, but the HUD display of only the portion with the reduced background visibility may be set to be transparent and the HUD display of other portions may be maintained.

Figure 2:
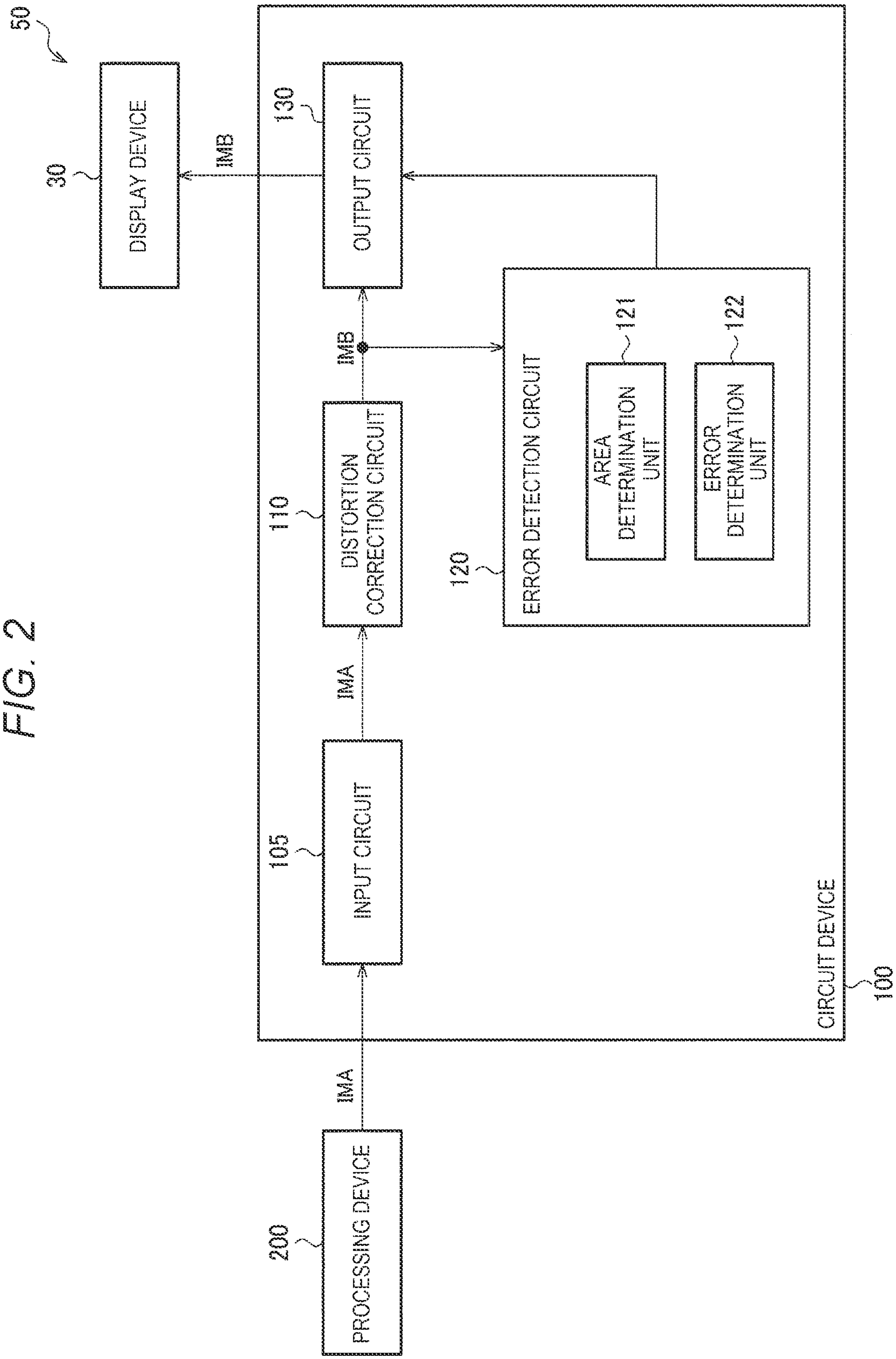
FIG. 2 shows a first configuration example of a head-up display apparatus and a circuit device.

FIG. 2 shows a first configuration example of a head-up display apparatus 50 and a circuit device 100 used for the head-up display apparatus 50 in the embodiment. The head-up display apparatus 50 includes a display device 30, the circuit device 100, and a processing device 200.

The processing device 200 transmits input image data IMA as image data of an input image to the circuit device 100. The processing device 200 is the so-called SoC e.g. a processor such as a CPU or a microcomputer. SoC is an abbreviation for System on Chip. CPU is an abbreviation for Central Processing Unit.

The circuit device 100 includes an input circuit 105, a distortion correction circuit 110, an error detection circuit 120, and an output circuit 130. The circuit device 100 is e.g.

an integrated circuit device in which a plurality of circuit elements are integrated on a semiconductor substrate.

The input circuit 105 receives the input image data IMA from the processing device 200. The input circuit 105 may be a receiving circuit of various communication interfaces and, as an example, a receiving circuit of LVDS, DVI, display port, GMSL, or GVIF. LVDS is an abbreviation for LOW voltage differential signaling, DVI is an abbreviation for Digital Visual Interface, GMSL is an abbreviation for Gigabit Multimedia Serial Link, and GVIF is an abbreviation for Gigabit Video InterFace.

The distortion correction circuit 110 performs a distortion correction on the input image data IMA using coordinate transformation between pixel coordinates in the input image data IMA and pixel coordinates in output image data IMB and outputs a result thereof as the output image data IMB as image data of an output image. The distortion correction is an image correction to form HUD display with no or reduced distortion by providing reverse image distortion to image distortion when an image displayed on a display panel is projected on the image. The image distortion by projection includes one or both of image distortion due to a curved surface of the screen and image distortion due to an HUD optical system.

The distortion correction circuit 110 corresponds to a reverse warp engine or a forward warp engine. Reverse warp is warp processing of coordinate-transforming the pixel coordinates on the output image data IMB into reference coordinates corresponding thereto and obtaining pixel data of the output image data IMB from pixel data of the input image data IMA at the reference coordinates. Forward warp is warp processing of coordinate-transforming the pixel coordinates on the input image data IMA to movement destination coordinates corresponding thereto and obtaining pixel data of the output image data IMB at the movement destination coordinates from pixel data of the input image data IMA at the pixel coordinates. The coordinate transformations in the reverse warp and the forward warp are defined by warp parameters. The warp parameters are a table in which coordinates on the input image data IMA are correlated with coordinates on the output image data IMB, a table showing amounts of movement between the coordinates on the input image data IMA and the coordinates on the output image data IMB, coefficients of a polynomial correlating the coordinates on the input image data IMA with the coordinates on the output image data IMB, or the like.

Note that the distortion correction circuit 110 and the error detection circuit 120 are logic circuits. The respective distortion correction circuit 110 and error detection circuit 120 may be formed as individual circuits or the distortion correction circuit 110 and the error detection circuit 120 may be formed as an integrated circuit by automatic placement and routing or the like. Alternatively, part or all of these logic circuits may be realized by a processor such as a DSP. DSP is an abbreviation for Digital Signal Processor. In this case, programs and command sets in which functions of the respective circuits are described are stored in a memory, and the programs and command sets are executed by the processor and the functions of the respective circuits are realized.

The output circuit 130 transmits the output image data IMB to the display device 30. The output circuit 130 may be a transmitting circuit of various communication interfaces and, as an example, a transmitting circuit of LVDS, DVI, display port, GMSL, or GVIF.

The display device 30 displays a virtual image in the field of view of the user based on the output image data IMB received from the circuit device 100. The display device 30 includes a display controller, a display driver, an image display device, and an optical system. Note that the configuration of the display device 30 is not limited to that, but the circuit device 100 may have a function of the display controller, for example.

The display controller performs image data transmission to the display driver and display timing control based on the received output image data IMB. The display driver drives the image display device based on the image data from the display controller and the display timing control, and the image display device displays an image corresponding to the output image data IMB. The optical system includes a reflection plate etc. and projects the image displayed by the image display device on the screen. The screen may be a transparent member on which an image is projected having a projection surface reflecting the projected light. For example, the screen is a windscreen of a moving body on which the HUD is mounted. The image display device includes e.g. a liquid crystal display panel and a backlight device. Alternatively, the image display device may include a laser source, a mirror reflecting a laser, and an actuator driving the mirror to scan with the laser. Alternatively, the image display device may be a digital mirror device including a laser source, an array of micromirrors, and an actuator driving the respective micromirrors. Alternatively, the image display device may be a self-emitting display panel such as an OLED display panel. OLED is an abbreviation for Organic Light Emitting Diode.

The error detection circuit 120 of the circuit device 100 detects an occlusion error in the display image of the display device 30 based on the output image data IMB. In view of the detection of the occlusion error in the HUD display, it is desirable to make an error determination based on image data at the stage as close as possible to the HUD display. Accordingly, the error detection circuit 120 detects the occlusion error based on the output image data IMB. The occlusion error is an error that the virtual display object displayed by the HUD reduces the visibility of the background overlapping with the display object. Note that the occlusion error refers not only to reduction of visibility of a specific object e.g. a pedestrian or the like but also to a possibility that the display object of the HUD reduces visibility of an arbitrary background.

Figure 3:
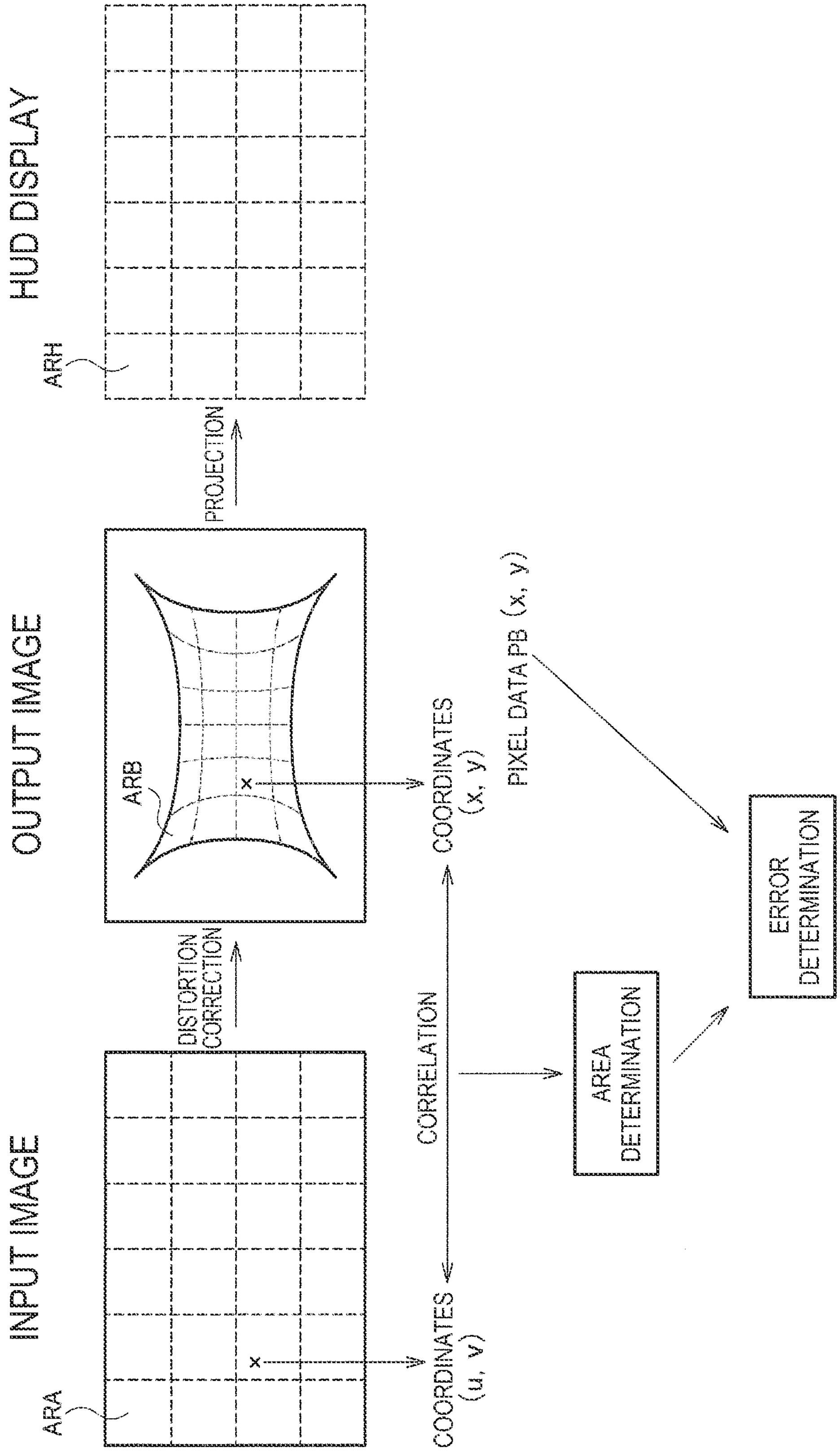
FIG. 3 is a diagram for explanation of an operation of an error detection circuit.

FIG. 3 is a diagram for explanation of an operation of the error detection circuit 120. The error detection circuit 120 includes an area determination unit 121 and an error determination unit 122. Note that dashed lines show divisional areas, but are not actually displayed.

As shown in FIG. 3, the area determination unit 121 sets a first divisional area group formed by division of an input image. The respective first divisional areas of the first divisional area group are shown by ARA. Specifically, the divisional areas are set by a plurality of straight lines in horizontal scanning directions and a plurality of straight lines in vertical directions. The circuit device 100 includes an area setting register (not shown), the processing device 200 writes setting information of the first divisional area group in the area setting register, and the area determination unit 121 sets the first divisional area group based on the setting information. Note that FIG. 3 shows an example of 6×4 divisions of the image, however, the number of divisions is not limited to that. Further, FIG. 3 shows an example of equal division of the image in the horizontal directions and the vertical directions, however, the image may be unequally divided. For example, the image may be finely divided in the vertical directions in the upper part of the screen or finely divided in the center part in the horizontal directions.

The input image is HUD-projected after the distortion correction in the reverse direction to the distortion by HUD projection, and display without distortion like the input image is obtained. That is, setting the first divisional area group in the input image is equivalent to setting a divisional area group in the HUD display. The divisional area group in the HUD display is referred to as "third divisional area group" and the respective third divisional areas are shown by ARH. The shape of the third divisional area ARH is the same as that of the first divisional area ARA corresponding to the third divisional area ARH. Coordinates (u,v) on the input image are correlated with coordinates (x,y) on the output image by coordinate transformation of the distortion correction. The output image is divided into a second divisional area group corresponding to the first divisional area group by the correlation of the coordinates. The respective second divisional areas of the second divisional area group are shown by ARB. The second divisional area ARB has a shape distorted by the distortion correction.

As described above, the respective third divisional areas ARH of the HUD display may be correlated with the respective second divisional areas ARB of the output image. Thereby, the error detection circuit 120 detects an error from the output image data IMB of the second divisional area ARB in the output image, and thereby, may detect an occlusion error of the third divisional area ARH corresponding to the second divisional area ARB in the HUD display.

Specifically, the area determination unit 121 determines the first divisional area ARA of the first divisional area group to which the coordinates (u,v) on the input image corresponding to the coordinates (x,y) on the output image belong. When the plurality of coordinates (u,v) corresponding to the plurality of coordinates (x,y) belong to the same first divisional area ARA, the area determination unit 121 judges that the plurality of coordinates (x,y) belong to the same second divisional area ARB. In this manner, the second divisional area ARB of the output image corresponding to the first divisional area ARA set in the input image is judged. The pixel data of the output image data IMB at the coordinates (x,y) is referred to as PB (x,y). The error determination unit 122 determines an occlusion error of the third divisional area ARH corresponding to the second divisional area ARB from all pixel data PB (x,y) belonging to the second divisional area ARB. The error determination unit 122 executes the error determination on the respective second divisional areas ARB.

Figure 4:
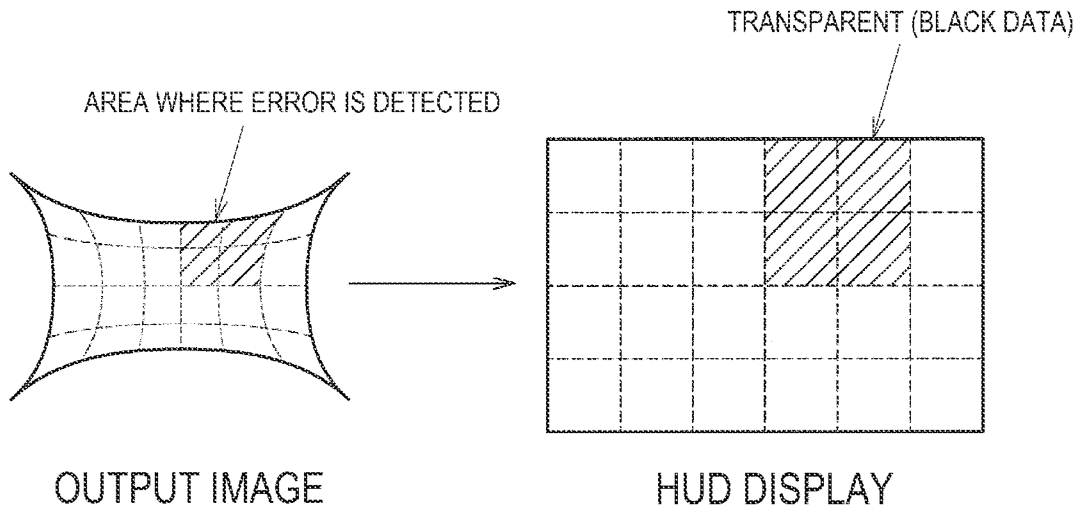
FIG. 4 is a diagram for explanation of an operation of the circuit device when an occlusion error is detected.

FIG. 4 is a diagram for explanation of an operation of the circuit device 100 when an occlusion error is detected. FIG. 4 shows divisional areas where an occlusion error is detected by hatching, however, the hatching is not actually displayed.

The error determination unit 122 outputs an error determination result to the output circuit 130. The error determination result is information of the second divisional area ARB where the occlusion error is detected. Specifically, the error determination result is the coordinates (x, y) of the pixel belonging to the second divisional area ARB where the occlusion error is detected. The output circuit 130 sets the output image data IMB in the second divisional area ARB where the occlusion error is detected to a transparent color. The transparent color is a color through which the background is seen with nothing displayed in the HUD display when a color displayed on the display panel is projected by the HUD. Specifically, the HUD display becomes transparent when the pixel of the display panel blocks the light, and a color as a black color displayed on the display panel corresponds to the transparent color. For example, black data in the image data is represented in the transparent color in the HUD display.

Note that the error determination unit 122 may output the error determination result to the input circuit 105 or the distortion correction circuit 110. The error determination result is information of the first divisional area ARA corresponding to the second divisional area ARB where the occlusion error is detected. The input circuit 105 or the distortion correction circuit 110 sets the input image data IMA in the first divisional area ARA corresponding to the second divisional area ARB where the occlusion error is detected to the transparent color.

In the above described embodiment, the circuit device 100 is used for the head-up display apparatus 50. The circuit device 100 includes the distortion correction circuit 110 and the error detection circuit 120. The distortion correction circuit 110 performs the distortion correction on the input image data IMA as the image data of the input image and outputs the output image data IMB as the image data of the output image after the distortion correction. The respective first divisional areas ARA of the first divisional area group formed by division of the input image correspond to the respective second divisional areas ARB of the second divisional area group in the output image in the distortion correction. Here, the error detection circuit 120 detects the occlusion error in the display image of the head-up display apparatus 50 based on the output image data IMB of the respective second divisional areas ARB.

According to the embodiment, when the background visibility is partially reduced in the HUD display, the area with the reduced background visibility may be detected. Specifically, the occlusion error is detected based on the output image data IMB of the respective second divisional areas ARB, and the area on the HUD display in which the second divisional area where the occlusion error is detected is projected is detected as the area with the reduced background visibility. Thereby, for example, the background visibility is secured by transparent display of the area where the occlusion error is determined and the HUD display in the other areas is maintained, and the information presentation to the user may be continued.

Further, according to the embodiment, the occlusion error is detected from the output image data IMB after the distortion correction and, even when a processing error occurs in the distortion correction, the occlusion error is determined including the influence of the processing error. Here, the output image is a distorted image due to the distortion correction, and the first divisional area group is set in the undistorted input image. According to the embodiment, the respective first divisional areas ARA of the first divisional area group formed by division of the input image correspond to the respective second divisional areas ARB of the second divisional area group in the output image in the distortion correction, and the error detection circuit 120 may detect the occlusion errors in the respective second divisional areas ARB using the correlations.

Further, in the embodiment, the error detection circuit 120 determines correlations between the respective first divisional areas ARA and the respective second divisional areas ARB based on correlation information between coordinates GZA=(u,v) on the input image and coordinates GZB=(x,y) on the output image correlated by the distortion correction.

According to the embodiment, coordinate transformation between the coordinates GZA=(u,v) on the input image and the coordinates GZB=(x,y) on the output image is performed in the coordinate transformation of the distortion correction. The error detection circuit 120 may determine the first divisional area ARA to which the coordinates GZA=(u,v) on the input image corresponding to the coordinates GZB=(x,y) on the output image belong using the correlation. Thereby, the first divisional area ARA on the input image is correlated with the second divisional area ARB on the output image.

Furthermore, in the embodiment, the error detection circuit 120 sets the output image data IMB of the second divisional area ARB determined as having the occlusion error of the second divisional area group to transparent color data represented in the transparent color in the display image of the head-up display apparatus 50. The transparent color data is e.g. black data.

According to the embodiment, the data of the second divisional area ARB determined as having the occlusion error is set to the transparent color data and, when the second divisional area ARB is projected by the HUD, the area is transparent. Thereby, the area that may have reduced visibility in the HUD display is transparently displayed and the visibility is secured.

2. First to Third Detailed Configuration Examples of Circuit Device

Figure 5:
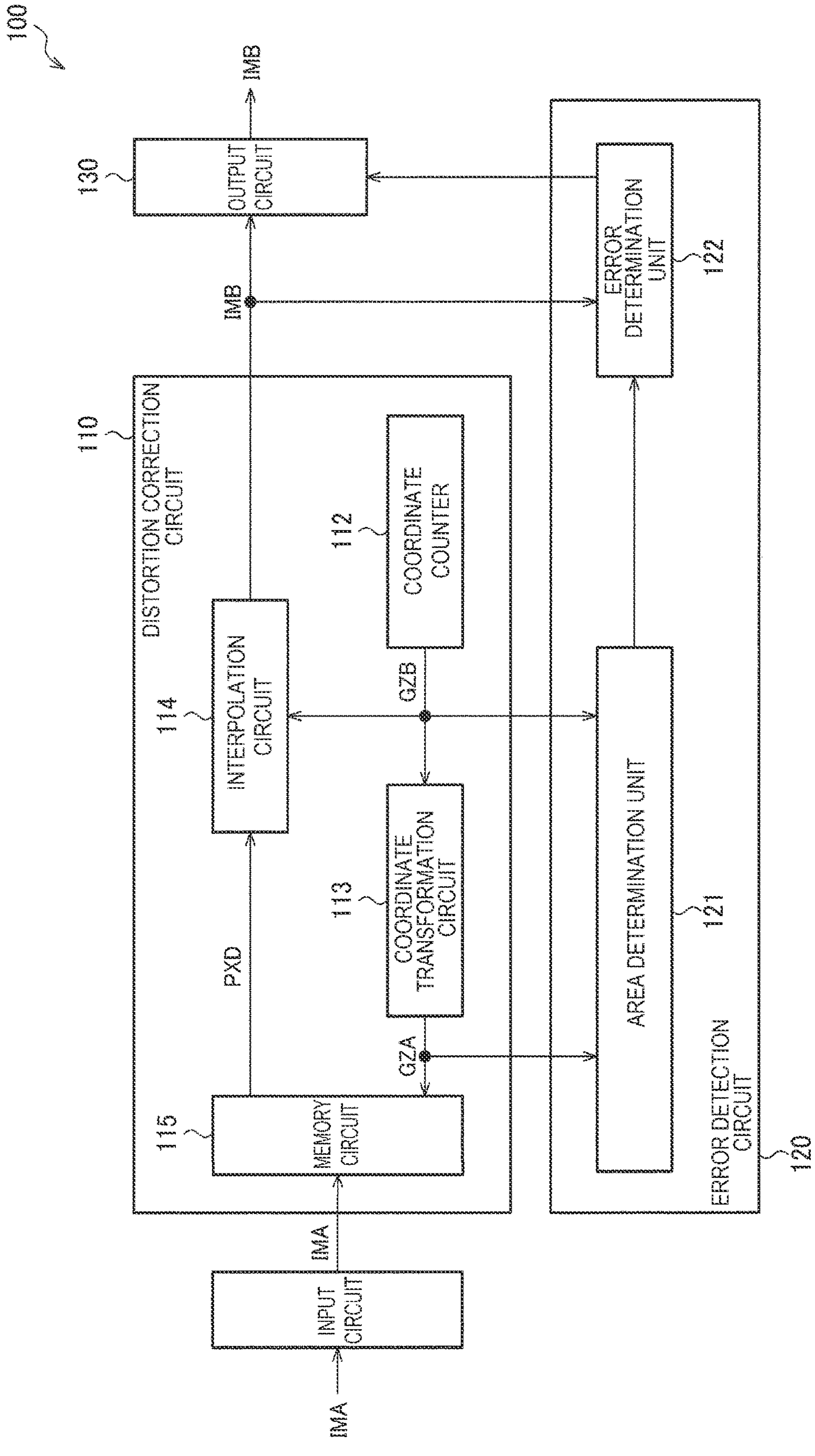
FIG. 5 shows a first detailed configuration example of the circuit device.

FIG. 5 shows a first detailed configuration example of the circuit device 100. In FIG. 5, the distortion correction circuit 110 includes a coordinate counter 112, a coordinate transformation circuit 113, an interpolation circuit 114, and a memory circuit 115. Here, an example in which the distortion correction circuit 110 is a reverse warp engine is explained.

The coordinate counter 112 outputs the pixel coordinates GZB=(x,y) on the output image data IMB. The coordinate transformation circuit 113 transforms the pixel coordinates (x,y) into reference coordinates GZA=(u,v) on the input image data IMA. The memory circuit 115 temporarily stores the input image data IMA and outputs pixel data PXD of the reference coordinates (u,v). Specifically, the coordinate transformation circuit 113 transforms the reference coordinates (u,v) into a read address and the memory circuit 115 reads out the pixel data PXD of the reference coordinates (u,v) from the read address. More specifically, the transformation circuit 113 outputs the read addresses of the plurality of pixels around the reference coordinates (u,v) and the memory circuit 115 reads out the pixel data of the plurality of pixels. The interpolation circuit 114 performs interpolation processing on the plurality of pixel data read out in correlations with the reference coordinates (u,v) and obtains the pixel data of the pixel coordinates (x,y) in the output image data IMB.

The area determination unit 121 of the error detection circuit 120 determines the first divisional area ARA to which the reference coordinates GZA=(u,v) on the input image data IMA belong and determines the second divisional area ARB to which the pixel coordinates (x,y) on the output image data IMB belong.

The error determination unit 122 obtains occlusion determination indexes of the respective second divisional areas ARB and determines whether or not the respective second divisional areas ARB have the occlusion errors by comparing the occlusion determination indexes to a threshold. The occlusion determination index is an index, when the second divisional area ARB is projected by the display device 30, indicating the degree of blocking of the real object by the HUD display in the third divisional area ARH corresponding to the second divisional area ARB.

Figure 6:
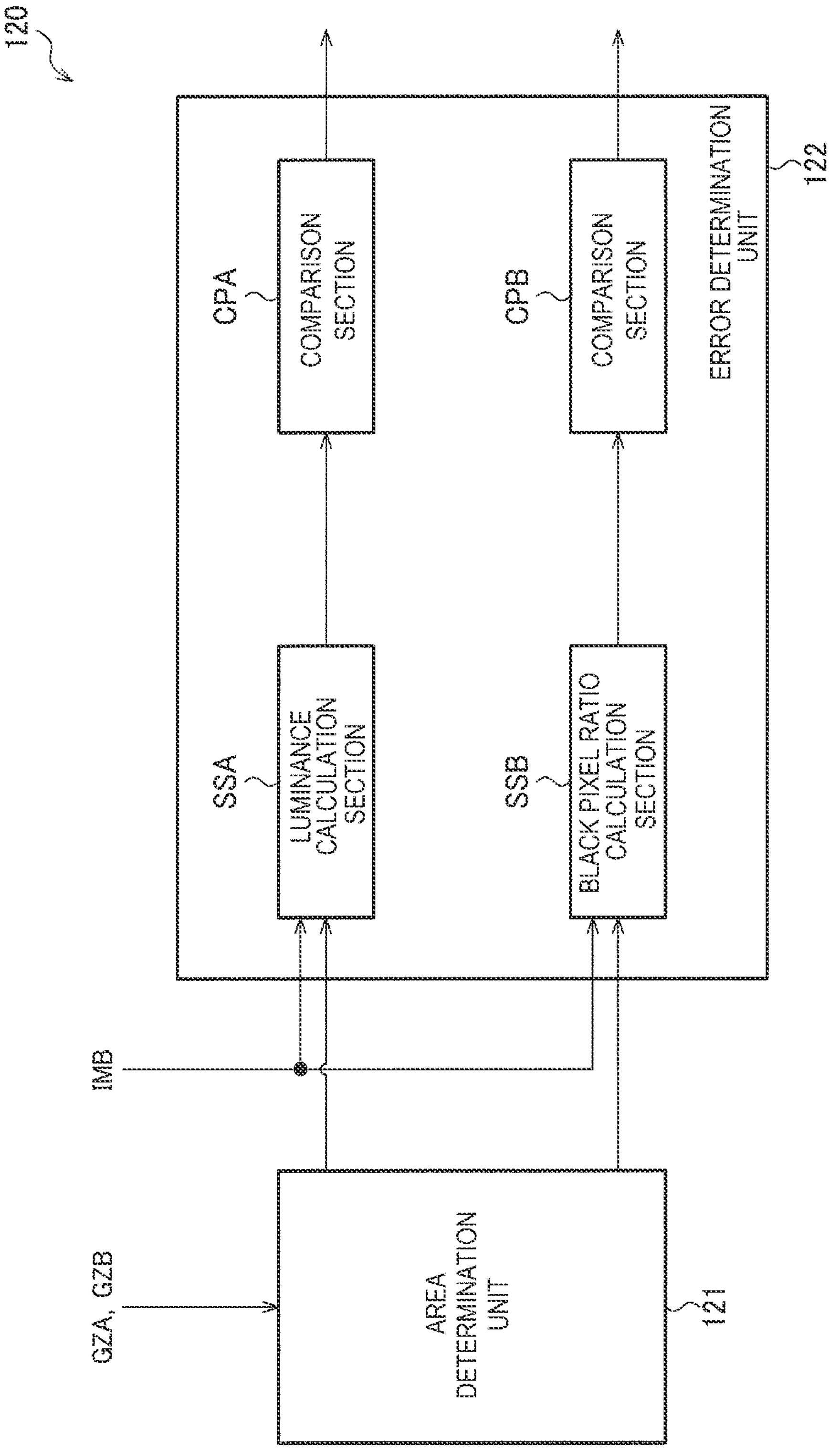
FIG. 6 shows a detailed configuration example of the error detection circuit.

FIG. 6 shows a detailed configuration example of the error detection circuit 120. In FIG. 6, the error determination unit 122 includes a luminance calculation section SSA, a black pixel ratio calculation section SSB, a comparison section CPA, and a comparison section CPB. Here, an example in which the occlusion determination indexes are an average luminance value and a black pixel ratio is explained, however, the occlusion determination index is not limited to that. For example, the occlusion determination index may be only one of the average luminance value and the black pixel ratio.

The luminance calculation section SSA obtains the average luminance values of the respective second divisional areas ARB as the occlusion determination indexes based on the area determination result and the output image data IMB. Specifically, the average luminance value Yave is obtained using the following expressions (1) to (3).

$$Yi = Cr\times R + Cb\times B + Cg\times G \quad (1)$$

$$\text{if } (Yi \le 255)\ Y = Yi,\ \text{if } (Yi > 255)\ Y = 255 \quad (2)$$

$$Yave = \Sigma Y / Ntotal \quad (3)$$

In the above expression (1), Cr, Cb, Cg are predetermined coefficients. R is an R pixel value of the pixel at (x,y), B is a B pixel value of the pixel at (x,y), and G is a G pixel value of the pixel at (x,y). In the above expression (3), E shows addition of Y of all pixels belonging to the second divisional area as a subject of Yave calculation. Ntotal shows the number of pixels of all pixels belonging to the second divisional area as the subject of Yave calculation.

The comparison section CPA compares the average luminance values Yave of the respective second divisional areas ARB to a threshold of the average luminance value and determines the second divisional area ARB having the Yave larger than the threshold as having the occlusion error. A common threshold may be set for all second divisional areas ARB or a threshold may be independently set with respect to each second divisional area ARB.

The black pixel ratio calculation section SSB obtains the black pixel ratios of the respective second divisional areas ARB as the occlusion determination indexes based on the area determination result and the output image data IMB. The black pixel ratio is a ratio of the number of black pixels to the number of all pixels belonging to the second divisional area. The black pixel is a pixel of black data, but not limited to complete black data. Substantially black data may be employed. Specifically, the black pixel ratio BPratio is obtained using the following expressions (4) and (5).

$$BPX = (R < Rth)\ \&\&\ (B < Bth)\ \&\&\ (G < Gth) \quad (4)$$

$$BPratio = \Sigma BPX / total \quad (5)$$

In the above expression (4), Rth is a threshold of the R pixel value, Bth is a threshold of the B pixel value, and Gth is a threshold of the G pixel value. (condition a) && (condition b) is 1 if the condition a is satisfied and the condition b is satisfied and 0 if not.

The comparison section CPB compares the black pixel ratios BPratio of the respective second divisional areas ARB to a threshold of the black pixel ratio and determines the second divisional area ARB having the BPratio smaller than the threshold as having the occlusion error. A common threshold may be set for all second divisional areas ARB or a threshold may be independently set with respect to each second divisional area ARB.

The error determination unit 122 may output both the error determination result by the comparison section CPA and the error determination result by the comparison section CPB. Alternatively, the error determination unit 122 may determine the second divisional area ARB determined as having an error by at least one of the comparison section CPA and the comparison section CPB as having the occlusion error and output the determination result. Alternatively, the error determination unit 122 may determine the second divisional area ARB determined as having an error by both the comparison section CPA and the comparison section CPB as having the occlusion error and output the determination result.

Figure 7:
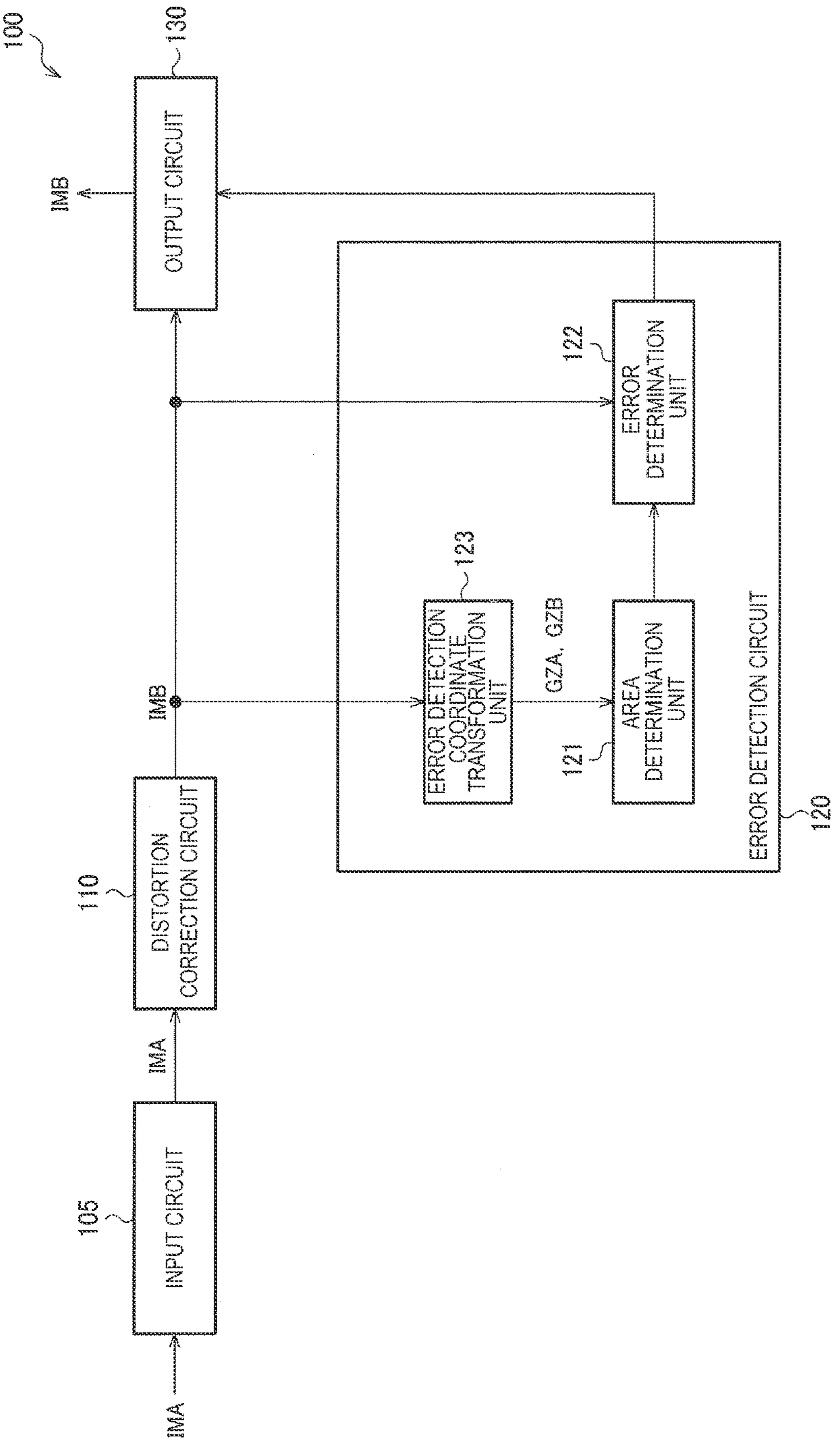
FIG. 7 shows a second detailed configuration example of the circuit device.

FIG. 7 shows a second detailed configuration example of the circuit device 100. In FIG. 7, the error detection circuit 120 includes the area determination unit 121, the error determination unit 122, and an error detection coordinate transformation unit 123.

The error detection coordinate transformation unit 123 transforms the coordinates (x,y) on the output image data IMB into coordinates GZA=(u,v) on the input image data IMA. The area determination unit 121 determines the first divisional area ARA to which the coordinates GZA on the input image data IMA belong based on the coordinates GZA, GZB from the error detection coordinate transformation unit 123 and determines the second divisional area ARB to which the coordinates GZB on the output image data IMB belong. The error determination unit 122 obtains the occlusion determination indexes of the respective second divisional areas ARB based on the area determination result and the output image data IMB and determines whether or not the respective second divisional areas ARB have the occlusion errors by comparing the occlusion determination indexes to a threshold.

Figure 8:
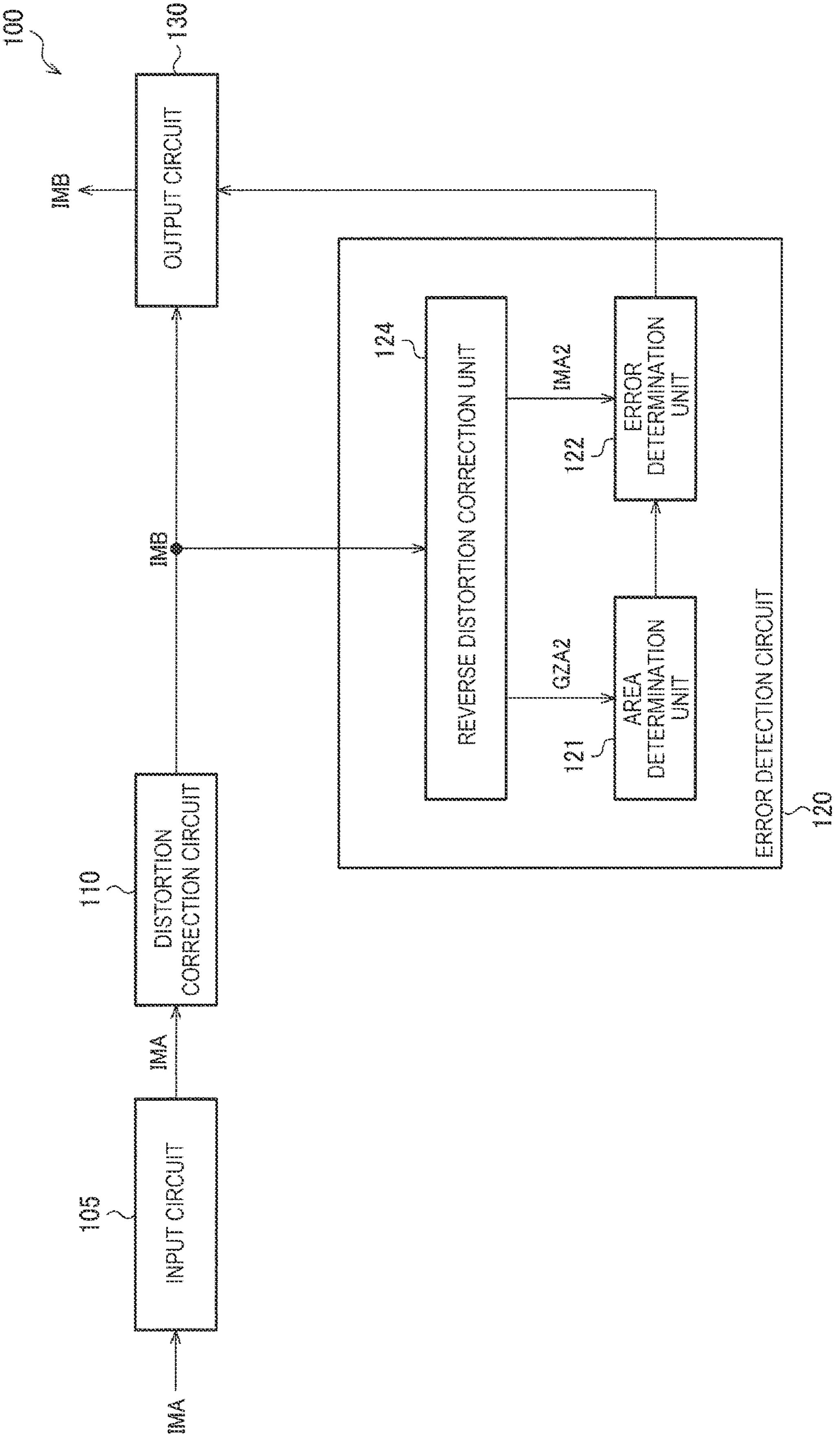
FIG. 8 shows a third detailed configuration example of the circuit device.

FIG. 8 shows a third detailed configuration example of the circuit device 100. In FIG. 8, the error detection circuit 120 includes the area determination unit 121, the error determination unit 122, and a reverse distortion correction unit 124.

The reverse distortion correction unit 124 generates second input image data IMA2 by performing a reverse distortion correction as a reverse correction to the distortion correction performed by the distortion correction circuit 110 on the output image data IMB. When the reverse distortion correction is a complete reverse correction, the second input image data IMA2 coincide with the input image data IMA. Note that the reverse distortion correction may not be a complete reverse correction due to interpolation processing or the like, and the second input image data IMA2 may be substantially the same as the input image data IMA. The area determination unit 121 determines the first divisional area ARA to which coordinates GZA2 on the second input image data IMA2 belong. The error determination unit 122 obtains occlusion determination indexes of the respective first divisional areas ARA based on the area determination result and the second input image data IMA2 and determines whether or not the respective first divisional areas ARA have the occlusion errors by comparing the occlusion determination indexes to a threshold. Whether or not the respective first divisional areas ARA have the occlusion errors are determined, and thereby, whether or not the respective second divisional areas ARB corresponding to the respective first divisional areas ARA have the occlusion errors is determined.

In the above described embodiment, the error detection circuit 120 obtains the occlusion determination indexes indicating occlusions by the display image of the head-up display apparatus 50 for the respective second divisional areas ARB based on the output image data IMB of the respective second divisional areas ARB. The error detection circuit 120 detects occlusion errors based on the occlusion determination indexes of the respective second divisional areas ARB.

According to the embodiment, the error detection circuit 120 obtains the occlusion determination indexes of the respective second divisional areas ARB based on the output image data IMB of the respective second divisional areas ARB, and thereby, may evaluate background visibility when the respective second divisional areas ARB are projected by the HUD. Further, the error detection circuit 120 detects the occlusion errors based on the occlusion determination indexes of the respective second divisional areas ARB, and thereby, an area where the background visibility can be reduced in the HUD display may be detected.

Further, in the embodiment, the error detection circuit 120 obtains brightness information of the respective second divisional areas ARB as the occlusion determination indexes. In the example of FIG. 6, the brightness information is an average luminance value, however, not limited to that. Any information representing brightness of an image within the second divisional area ARB may be employed.

According to the embodiment, the error detection circuit 120 may judge whether or not the respective second divisional areas ARB have the occlusion errors based on the brightness information of the respective second divisional areas ARB. Specifically, the error detection circuit 120 may determine the bright second divisional area ARB of the second divisional area group as having the occlusion error.

Further, in the embodiment, the error detection circuit 120 obtains black pixel ratio information of the respective second divisional areas ARB as the occlusion determination indexes.

According to the embodiment, the error detection circuit 120 may judge whether or not the respective second divisional areas ARB have the occlusion errors based on the black pixel ratio information of the respective second divisional areas ARB. Specifically, the black pixel ratio represents a ratio of a transparent area when the second divisional area ARB is projected by the HUD. The error detection circuit 120 may determine the second divisional area having the high ratio of the transparent area when projected by the HUD of the second divisional area group as having the occlusion error.

Furthermore, in the embodiment, the error detection circuit 120 detects the occlusion error by comparing the occlusion determination index to the threshold.

According to the embodiment, the error detection circuit 120 may determine the second divisional area ARB having the lower background visibility than predetermined background visibility as having the occlusion error by comparing the occlusion determination indexes indicating the degrees of background visibility when the respective second divisional areas ARB are projected by the HUD to the threshold.

Moreover, in the embodiment, the circuit device 100 includes a threshold register 150 storing thresholds of the respective first t divisional areas ARA. The error detection circuit 120 detects the occlusion errors by comparing the occlusion determination indexes of the respective second divisional areas ARB to the thresholds of the respective first divisional areas ARA corresponding to the respective second divisional areas ARB.

The output image is a distorted image due to the distortion correction, and the first divisional area group is set in the undistorted input image. The error detection circuit 120 may determine whether or not the respective second divisional areas ARB have the occlusion errors by comparing the occlusion determination indexes of the respective second divisional areas ARB to the thresholds of the respective first divisional areas ARA corresponding to the respective second divisional areas ARB.

3. Fourth Detailed Configuration Example of Circuit Device

Figure 9:
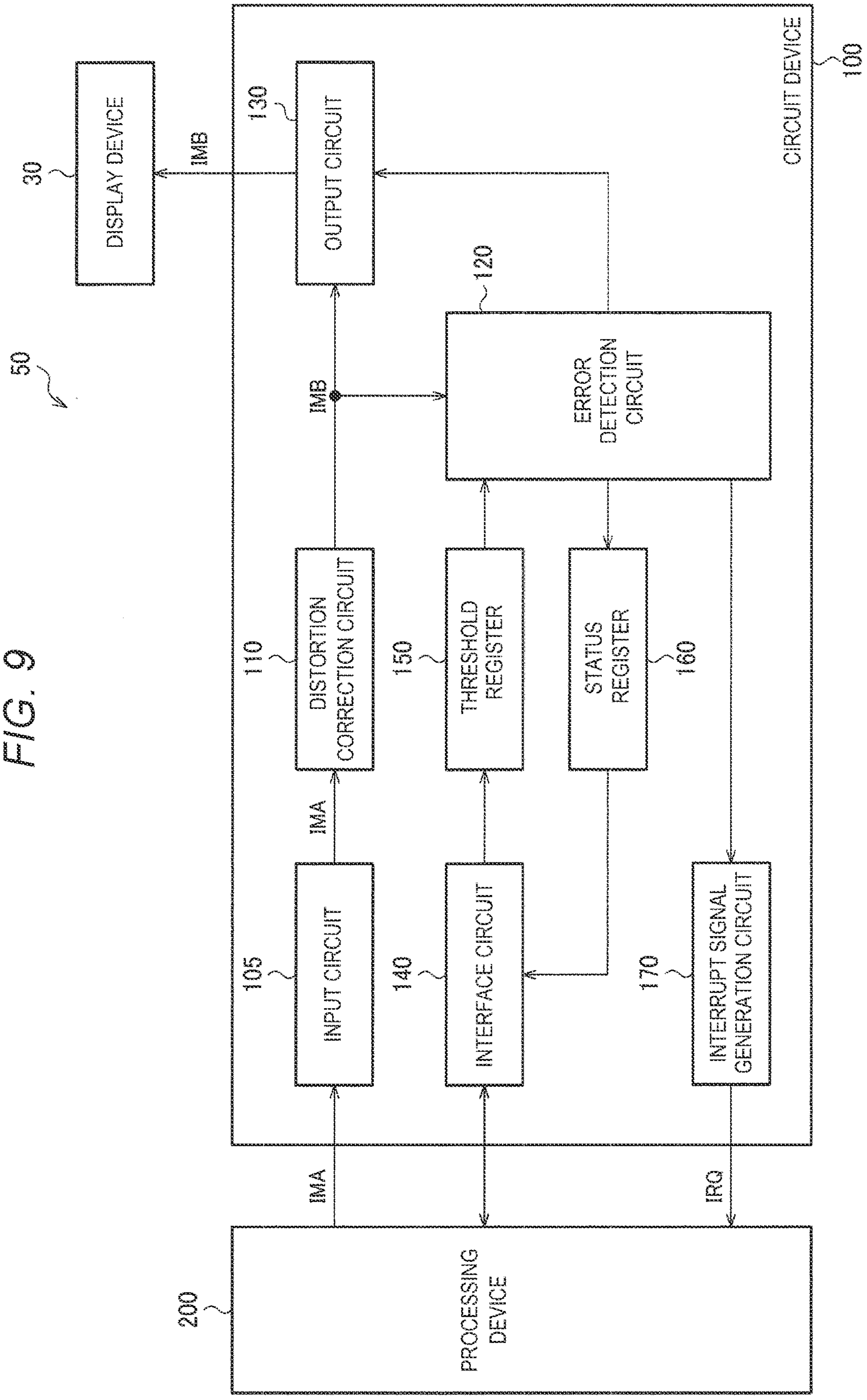
FIG. 9 shows a fourth detailed configuration example of the circuit device.

FIG. 9 shows a fourth detailed configuration example of the circuit device 100. The fourth detailed configuration example can be combined with any one of the above described first to third detailed configuration examples. In FIG. 9, the circuit device 100 includes the input circuit 105, the distortion correction circuit 110, the error detection circuit 120, the output circuit 130, an interface circuit 140, the threshold register 150, a status register 160, and an interrupt signal generation circuit 170.

The interface circuit 140 is a communication interface for controlling the circuit device 100 by the processing device 200. The interface circuit 140 is a serial interface of e.g. an SPI standard or an I2C standard. SPI is an abbreviation for Serial Peripheral Interface, and I2C is an abbreviation for Inter-Integrated Circuit.

The processing device 200 writes the thresholds to be compared to the occlusion determination indexes in the threshold register 150 via the interface circuit 140. The processing device 200 independently sets the threshold with respect to each first divisional area ARA. Further, the processing device 200 sets thresholds of the average luminance value and thresholds of the black pixel ratio for the respective first divisional areas ARA. The error detection circuit 120 detects the occlusion error by comparing the occlusion determination index of the second divisional area ARB to the threshold set for the first divisional area ARA corresponding to the second divisional area ARB.

The error detection circuit 120 writes the information representing the second divisional area ARB where the occlusion error is detected of the second divisional area group in the status register 160. The information representing the second divisional area ARB where the occlusion error is detected may be information representing the first divisional area ARA corresponding to the second divisional area ARB where the occlusion error is detected.

The interrupt signal generation circuit 170 outputs an interrupt signal IRQ to the processing device 200 when the error detection circuit 120 detects the occlusion error. Specifically, when the occlusion errors are detected from one or more second divisional areas of the second divisional area group, the interrupt signal generation circuit 170 outputs the interrupt signal IRQ to the processing device 200.

When receiving the interrupt signal IRQ, the processing device 200 performs processing of dealing with the occlusion error. For example, the processing device 200 may turn off the backlight device of the display device 30 or stop transmission of the input image data IMA when receiving the interrupt signal IRQ. Alternatively, when receiving the interrupt signal IRQ, the processing device 200 acquires the information representing the second divisional area ARB where the occlusion error is detected from the status register 160 via the interface circuit 140. The processing device 200 performs processing of dealing with the occlusion error based on the acquired information. For example, the processing device 200 may transmit the input image data IMA in which the data of the first divisional area ARA corresponding to the second divisional area ARB where the occlusion error is detected is set to black data to the circuit device 100. In this case, the error detection circuit 120 does not necessarily output the detection result of the occlusion error to the output circuit 130.

In the above described embodiment, the circuit device 100 includes the interrupt signal generation circuit 170 generating the interrupt signal IRQ when the error detection circuit 120 detects the occlusion error.

According to the embodiment, when the error detection circuit 120 detects the occlusion error, the external processing device 200 may be informed of the occurrence of the occlusion error by the interrupt signal generation circuit 170 generating the interrupt signal IRQ.

Further, in the embodiment, the circuit device 100 includes the status register 160 storing the information representing the second divisional area ARB where the occlusion error is detected of the second divisional area group.

According to the embodiment, when the detection circuit 120 detects the occlusion error, the status register 160 may store the information representing the second divisional area ARB where the occlusion error is detected of the second divisional area group. For example, the external processing device 200 accesses the status register 160, and thereby, may grasp the second divisional area ARB where the occlusion error occurs, i.e., the first divisional area ARA where the occlusion error occurs.

4. Second Configuration Example of Display System and Circuit Device

Figure 10:
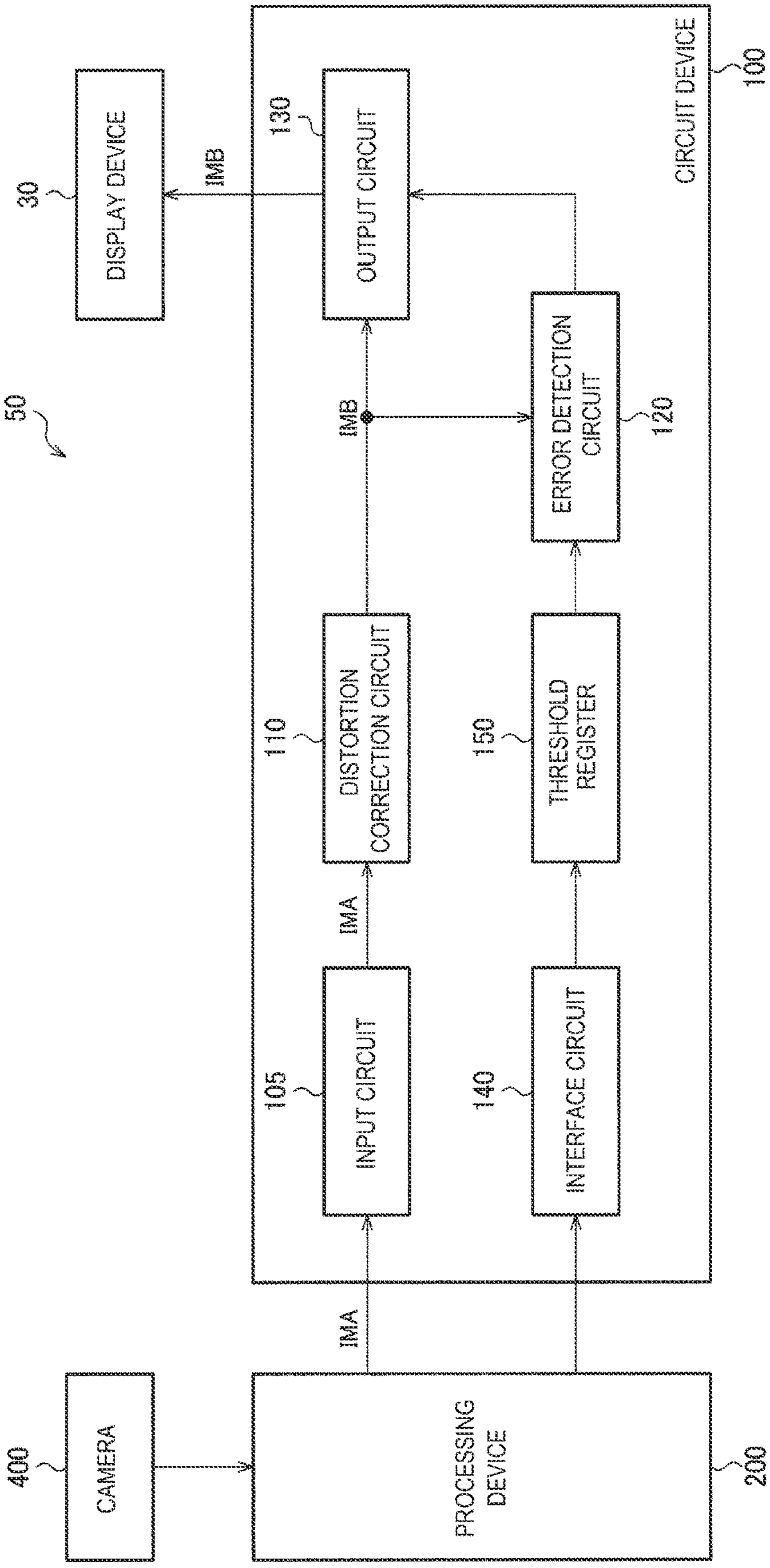
FIG. 10 shows a second configuration example of the head-up display apparatus and the circuit device.

FIG. 10 shows a second configuration example of the head-up display apparatus 50 and the circuit device 100. The second configuration example can be combined with any one of the above described first to fourth detailed configuration examples. In FIG. 10, the head-up display apparatus 50 includes the display device 30, the circuit device 100, the processing device 200, and a camera 400. The circuit device 100 includes the input circuit 105, the distortion correction circuit 110, the error detection circuit 120, the output circuit 130, the interface circuit 140, and the threshold register 150.

Figure 11:
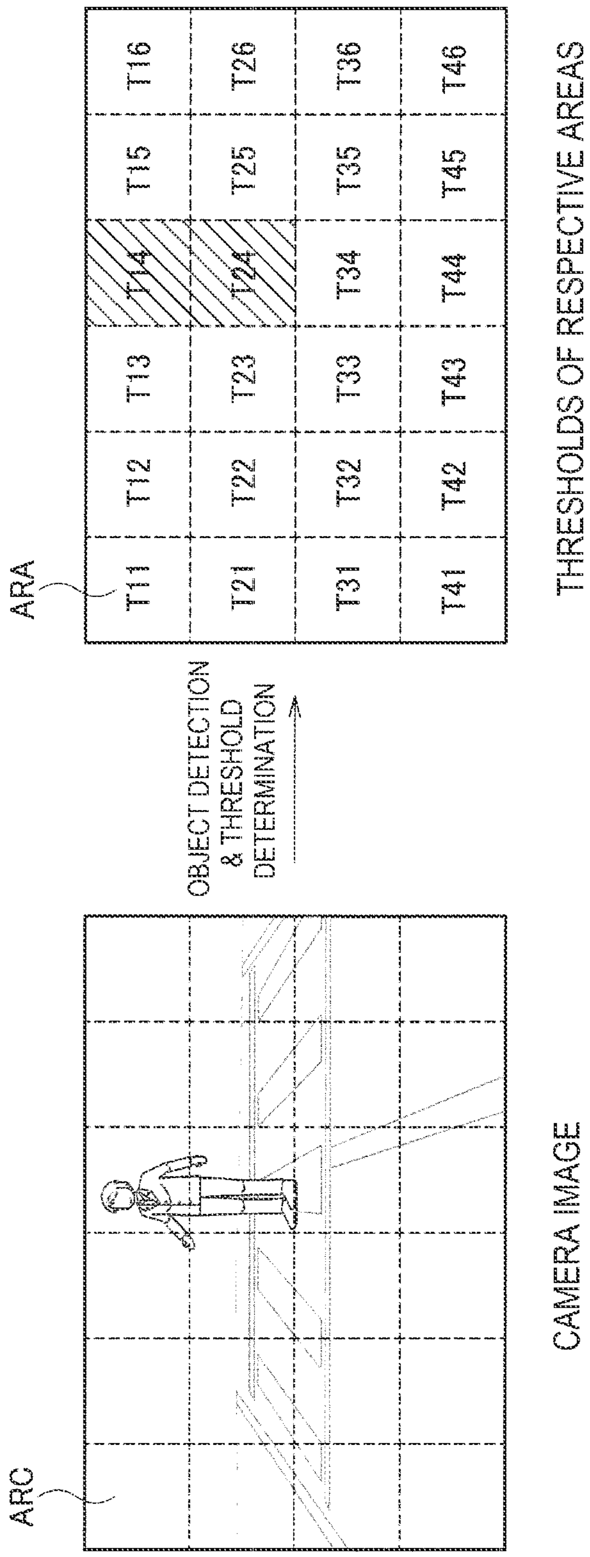
FIG. 11 is a diagram for explanation of an operation of the head-up display apparatus and the circuit device in the second configuration example.

FIG. 11 is a diagram for explanation of an operation of the head-up display apparatus 50 and the circuit device 100 in the second configuration example. The camera 400 images the real space overlapping with the HUD display. The processing device 200 receives a camera image formed by imaging of the real space from the camera 400 and sets the thresholds of the respective first divisional areas based on the camera image.

Specifically, as shown in the left part of FIG. 11, the processing device 200 sets a fourth divisional area group corresponding to the first divisional area group for the area where the HUD display is projected of the camera image. Respective fourth divisional areas of the fourth divisional area group are shown by ARC. The processing device 200 detects a specific object such as a pedestrian, a bicycle, or an automobile from the camera image and specifies the fourth divisional areas ARC containing the detected object. In the example of FIG. 11, the processing device 200 specifies the fourth divisional areas ARC in the first row and the fourth column and the second row and the fourth column.

As shown in the right part of FIG. 11, the processing device 200 changes the thresholds of the respective first divisional areas ARA based on the specification result of the areas. In the right part of FIG. 11, the first divisional areas ARA corresponding to the fourth divisional areas ARC judged as containing the specific object are shown by hatching. With i as a row and j as a column, Tij shows the threshold of the first divisional area ARA in the ith row and the jth column. The processing device 200 changes thresholds T14 and T24 of the first divisional areas ARA corresponding to the fourth divisional areas ARC judged as containing the specific object toward values at which the occlusion errors are determined more easily than the thresholds of the other first divisional areas. Specifically, when Tij is the threshold of the average luminance value, the processing device 200 sets the thresholds T14 and T24 to be smaller than the other thresholds. When Tij is the threshold of the black pixel ratio, the processing device 200 sets the thresholds T14 and T24 to be larger than the other thresholds.

The processing device 200 writes the threshold Tij in the threshold register 150 via the interface circuit 140. The error detection circuit 120 detects the occlusion error by comparing the occlusion determination index obtained from the output image data IMB of the second divisional area ARB in the ith row and the jth column in the second divisional area group to the threshold Tij.

In the above described embodiment, the head-up display apparatus 50 includes the processing device 200 controlling the circuit device 100 and the display device 30 projecting the display image based on the output image data IMB from the circuit device 100. The processing device 200 writes the thresholds of the respective first divisional areas ARA in the threshold register 150.

According to the embodiment, the processing device 200 writes the thresholds of the respective first divisional areas ARA in the threshold register 150, and thereby, may independently set the threshold with respect to each first divisional area ARA.

Further, in the embodiment, the processing device 200 changes the thresholds of the respective first divisional areas ARA based on the camera image from the camera 400 imaging the real space overlapping with the projected display image.

According to the embodiment, the processing device 200 may change the threshold of the first divisional area ARA according to the contents of the camera image of the real space overlapping with the area on the HUD display corresponding to the first divisional area ARA. Thereby, the determination threshold of the occlusion error may be controlled with respect to each area according to the condition of the real space.

The circuit device of the above described embodiment is used for the head-up display apparatus. The circuit device includes the distortion correction circuit and the error detection circuit. The distortion correction circuit performs the distortion correction on the input image data as the image data of the input image and outputs the output image data as the image data of the output image after the distortion correction. When the respective first divisional areas of the first divisional area group formed by division of the input image correspond to the respective second divisional areas of the second divisional area group in the output image in the distortion correction, the error detection circuit detects the occlusion errors in the display image of the head-up display apparatus based on the output image data of the respective second divisional areas.

According to the embodiment, when the background visibility is partially reduced in the HUD display, the area with the reduced background visibility may be detected. Specifically, the occlusion errors are detected based on the output image data of the respective second divisional areas, and thereby, the area on the HUD display on which the second divisional area where the occlusion error is detected is projected is detected as the area with the reduced background visibility. Further, according to the embodiment, the output image is a distorted image due to the distortion correction, and the first divisional area group is set in the undistorted input image. According to the embodiment, the respective first divisional areas of the first divisional area group formed by division of the input image correspond to the respective second divisional areas of the second divisional area group in the output image in the distortion correction, and the error detection circuit may detect the occlusion errors of the respective second divisional areas using the correlations.

Further, in the embodiment, the error detection circuit may obtain the occlusion determination indexes indicating the occlusions by the display image of the head-up display apparatus for the respective second divisional areas based on the output image data of the respective second divisional areas and detect the occlusion errors based on the occlusion determination indexes of the respective second divisional areas.

According to the embodiment, the error detection circuit obtains the occlusion determination indexes of the respective second divisional areas based on the output image data of the respective second divisional areas, and thereby, the background visibility when the respective second divisional areas are projected by the HUD may be evaluated. Further, the error detection circuit detects the occlusion errors based on the occlusion determination indexes of the respective second divisional areas, and thereby, the area where the background visibility can be reduced in the HUD display may be detected.

Furthermore, in the embodiment, the error detection circuit may obtain the brightness information of the respective second divisional areas as the occlusion determination indexes.

According to the embodiment, the error detection circuit may judge whether or not the respective second divisional areas have the occlusion errors based on the brightness information of the respective second divisional areas. Specifically, the error detection circuit may determine the bright second divisional area of the second divisional area group as having the occlusion error.

In the embodiment, the error detection circuit may obtain the black pixel ratio information of the respective second divisional areas as the occlusion determination indexes.

According to the embodiment, the error detection circuit may judge whether or not the respective second divisional areas have the occlusion errors based on the black pixel ratio information of the respective second divisional areas. Specifically, the error detection circuit may determine the second divisional area having the high ratio of the transparent area when projected by the HUD of the second divisional area group as having the occlusion error.

Further, in the embodiment, the error detection circuit may detect the occlusion error by comparing the occlusion determination indexes to the threshold.

According to the embodiment, the error detection circuit may determine the second divisional area having the lower background than visibility the predetermined background visibility as having the occlusion error by comparing the occlusion determination indexes indicating the degrees of background visibility when the respective second divisional areas are projected by the HUD to the threshold.

Furthermore, in the embodiment, the circuit device may include the threshold register storing the thresholds of the respective first divisional areas. The error detection circuit may detect the occlusion errors by comparing the occlusion determination indexes of the respective second divisional areas to the thresholds of the respective first divisional areas corresponding to the respective second divisional areas.

The output image is a distorted image due to the distortion correction, and the first divisional area group is set in the undistorted input image. The error detection circuit may determine whether or not the respective second divisional areas have the occlusion errors by comparing the occlusion determination indexes of the respective second divisional areas to the thresholds of the respective first divisional areas corresponding to the respective second divisional areas.

Further, in the embodiment, the error detection circuit may determine correlations between the respective first divisional areas and the respective second divisional areas based on the correlation information between the coordinates on the input image and the coordinates on the output image correlated by the distortion correction.

According to the embodiment, the coordinate transformation between the coordinates on the input image and the coordinates on the output image is performed in the coordinate transformation of the distortion correction. The error detection circuit may determine the first divisional area to which the coordinates on the input image corresponding to the coordinates on the output image belong using the correlations. Thereby, the first divisional areas on the input image and the second divisional areas on the output image are correlated.

In the embodiment, the circuit device may include the interrupt signal generation circuit generating the interrupt signal when the occlusion error is detected by the error detection circuit.

According to the embodiment, when the occlusion error is detected by the error detection circuit, the interrupt signal generation circuit generates the interrupt signal, and thereby, the external processing device may be informed of the occurrence of the occlusion error.

Further, in the embodiment, the circuit device may include the status register storing the information representing the second divisional area where the occlusion error is detected of the second divisional area group.

According to the embodiment, when the occlusion error is detected by the error detection circuit, the status register may store the information representing the second divisional area where the occlusion error is detected of the second divisional area group. For example, the external processing device accesses the status register, and thereby, may grasp the second divisional area where the occlusion error occurs, i.e., the first divisional area where the occlusion error occurs.

In the embodiment, the error detection circuit may set the output image data of the second divisional area determined as having the occlusion error of the second divisional area group to transparent color data represented in the transparent color in the display image of the head-up display device.

According to the embodiment, the data of the second divisional area determined as having the occlusion error is the transparent color data and, when the second divisional area is projected by the HUD, the area is transparent. Thereby, the area where the visibility can be reduced in the HUD display is transparently displayed and the visibility may be secured.

The head-up display apparatus of the embodiment includes the circuit device according to one of the above described circuit devices, the processing device controlling the circuit device, and the display device projecting the display image based on the output image data from the circuit device.

Further, the head-up display apparatus of the embodiment includes the above described circuit device, the processing device controlling the circuit device, and the display device projecting the display image based on the output image data from the circuit device. The processing device writes the thresholds of the respective first divisional areas in the threshold register.

According to the embodiment, the processing device writes the thresholds of the respective first divisional areas in the threshold register, and thereby, may independently set the threshold with respect to each first divisional area.

In the embodiment, the processing device may change the thresholds of the respective first divisional areas based on the camera image from the camera imaging the real space overlapping with the projected display image.

According to the embodiment, the processing device may change the threshold of the first divisional area according to the contents of the camera image of the real space overlapping with the with the area on the HUD display corresponding to the first divisional area. Thereby, the determination threshold of the occlusion error may be controlled with respect to each area according to the condition of the real space.

Note that the embodiments are explained in detail as described above, however, a person skilled in the art could easily understand that many modifications without substantively departing from the new matter and the effects of the present disclosure can be made. Therefore, the scope of the present disclosure includes all of these modified examples. For example, in the specification or the drawings, terms described with different terms in a broader sense or synonymous at least once may be replaced by the different terms in any part of the specification or the drawings. Further, the scope of the present disclosure includes all combinations of the embodiments and modified examples. Furthermore, the configurations, the operations, etc. of the circuit device, the head-up display apparatus, the processing device, the display system, etc. are not limited to those explained in the embodiments, but various modifications can be made.

What is claimed is:

1. A circuit device used for a head-up display apparatus, comprising:

a distortion correction circuit configured to perform a distortion correction on input image data as image data of an input image and outputting output image data as image data of an output image after the distortion correction, wherein the input image is divided into a plurality of first divisional areas, the output image is divided into a plurality of second divisional areas, and one area of the plurality of first divisional areas correspond to a corresponding area of the plurality of second divisional areas; and an error detection circuit configured to detect an occlusion error in a display image of the head-up display apparatus based on the output image data with respect to each of the plurality of second divisional areas, wherein, when the error detection circuit detects the occlusion error in an error detection area of the display image corresponding to a first area of the plurality of second divisional areas, the error detection circuit is further configured to set the output image data corresponding to the first area to transparent color data represented in a transparent color in the error detection area of the display image of the head-up display apparatus.

2. The circuit device according to claim 1, wherein the error detection circuit is further configured to obtain occlusion determination indexes indicating occlusions in the display image of the head-up display apparatus for the plurality of second divisional areas based on the output image data of the plurality of second divisional areas, and detect the occlusion error based on the occlusion determination indexes of the plurality of second divisional areas.

3. The circuit device according to claim 2, wherein the error detection circuit is further configured to obtain brightness information of the plurality of second divisional areas as the occlusion determination indexes.

4. The circuit device according to claim 2, wherein the error detection circuit is further configured to obtain black pixel ratio information of the plurality of second divisional areas as the occlusion determination indexes.

5. The circuit device according to claim 2, wherein the error detection circuit is further configured to detect the occlusion error by comparing the occlusion determination indexes to a threshold.

6. The circuit device according to claim 5, further comprising a threshold register configured to store the thresholds of the plurality of first divisional areas, wherein the error detection circuit is further configured to detect the occlusion error by comparing the occlusion determination indexes of the plurality of second divisional areas and the thresholds of the plurality of first divisional areas corresponding to the plurality of second divisional areas.

7. A head-up display apparatus comprising:

the circuit device according to claim 6;

a processing device configured to control the circuit device; and a display device configured to project the display image based on the output image data from the circuit device, wherein the processing device is further configured to write the thresholds of the plurality of first divisional areas in the threshold register.

8. The head-up display apparatus according to claim 7, wherein the processing device is further configured to change the thresholds of the plurality of first divisional areas based on a camera image from a camera imaging a real space overlapping with the projected display image.

9. The circuit device according to claim 1, wherein the error detection circuit is further configured to determine correlations between the plurality of first divisional areas and the plurality of second divisional areas based on correlation information of coordinates on the input image and coordinates on the output image correlated by the distortion correction.

10. The circuit device according to claim 1, further comprising an interrupt signal generation circuit configured to generate an interrupt signal when the occlusion error is detected by the error detection circuit.

11. The circuit device according to claim 10, further comprising a status register configured to store information representing the first area of the plurality of second divisional areas in which the occlusion error is detected.

12. A head-up display apparatus comprising:

the circuit device according to claim 1;

a processing device configured to control the circuit device; and a display device configured to project the display image based on the output image data from the circuit device.

* * * * *